United States Patent
Kanada

(10) Patent No.: US 10,571,144 B2
(45) Date of Patent: Feb. 25, 2020

(54) TERMINAL DEVICE, AIR CONDITIONER, AND WEARABLE TERMINAL

(71) Applicant: Mitsubishi Electric Corporation, Tokyo (JP)

(72) Inventor: Hiromitsu Kanada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 80 days.

(21) Appl. No.: 15/534,654

(22) PCT Filed: Mar. 27, 2015

(86) PCT No.: PCT/JP2015/059588
§ 371 (c)(1),
(2) Date: Jun. 9, 2017

(87) PCT Pub. No.: WO2016/157283
PCT Pub. Date: Oct. 6, 2016

(65) Prior Publication Data
US 2018/0045426 A1    Feb. 15, 2018

(51) Int. Cl.
*F24F 11/30* (2018.01)
*H04Q 9/00* (2006.01)
(Continued)

(52) U.S. Cl.
CPC .............. *F24F 11/30* (2018.01); *G08C 17/02* (2013.01); *G08C 23/04* (2013.01); *H04Q 9/00* (2013.01);
(Continued)

(58) Field of Classification Search
CPC .... F24F 11/30; F24F 2110/20; F24F 2120/10; F24F 2120/12; F24F 2120/14;
(Continued)

(56) References Cited

U.S. PATENT DOCUMENTS 7,813,840 B2    10/2010  Suyama et al.
2002/0140559 A1*  10/2002  Zhou ............... A61B 5/0002
                                              340/573.1
(Continued)

FOREIGN PATENT DOCUMENTS

EP    2 706 325 A2    3/2014
EP    2 711 215 A1    3/2014
(Continued)

OTHER PUBLICATIONS

International Search Report of the International Searching Authority dated Jun. 16, 2015 for the corresponding international application No. PCT/JP2015/059588 (and English translation).
(Continued)

*Primary Examiner* — Rocio Del Mar Perez-Velez
*Assistant Examiner* — Brian T McMenemy
(74) *Attorney, Agent, or Firm* — Posz Law Group, PLC

(57) ABSTRACT

A position detection unit detects a current position of the terminal device, an environmental-information acquisition unit acquires environmental information of the terminal device, and a storage unit stores therein a behavior pattern of a user of the terminal device, a control pattern of an air conditioner, and air-conditioner position information. The terminal device also includes a control unit that estimates an arrival time at which the user arrives at a position of the air conditioner based on the current position, a moving speed included in the environmental information, and the air-conditioner position information, estimates a behavior pattern of the user by using the moving speed, and decides a control pattern of the air conditioner based on the environmental information and the estimated behavior pattern.

6 Claims, 5 Drawing Sheets

(51) Int. Cl.
  *G08C 23/04* (2006.01)
  *G08C 17/02* (2006.01)
  *F24F 11/00* (2018.01)
  *F24F 11/56* (2018.01)
  *F24F 120/12* (2018.01)
  *F24F 120/10* (2018.01)
  *F24F 120/14* (2018.01)
  *F24F 110/20* (2018.01)
  *F24F 110/10* (2018.01)

(52) U.S. Cl.
  CPC ........... *F24F 11/56* (2018.01); *F24F 2110/10* (2018.01); *F24F 2110/20* (2018.01); *F24F 2120/10* (2018.01); *F24F 2120/12* (2018.01); *F24F 2120/14* (2018.01); *G08C 2201/91* (2013.01)

(58) Field of Classification Search
  CPC ....... F24F 11/56; F24F 2110/10; G08C 17/02; G08C 23/04; H04Q 9/00
  See application file for complete search history.

(56) References Cited

U.S. PATENT DOCUMENTS

| | | | | |
|---|---|---|---|---|
| 2003/0210126 | A1* | 11/2003 | Kanazawa | G07O 9/00142 340/5.5 |
| 2010/0036533 | A1* | 2/2010 | Masuda | F24F 11/30 700/278 |
| 2010/0228512 | A1* | 9/2010 | Rowe | G01D 1/00 702/85 |
| 2010/0286801 | A1 | 11/2010 | Yum et al. | |
| 2011/0218650 | A1* | 9/2011 | Crucs | G05B 11/01 700/13 |
| 2013/0238144 | A1* | 9/2013 | Shahapurkar | G05D 23/1923 700/278 |
| 2013/0304685 | A1* | 11/2013 | Kurata | G01O 21/20 706/45 |
| 2014/0070925 | A1* | 3/2014 | Shin | H04L 67/303 340/12.5 |
| 2014/0074296 | A1 | 3/2014 | Yum et al. | |
| 2014/0277762 | A1* | 9/2014 | Drew | F24F 11/0086 700/276 |
| 2014/0309790 | A1* | 10/2014 | Ricci | H04W 4/21 700/276 |
| 2014/0365017 | A1* | 12/2014 | Hanna | F24F 11/30 700/276 |
| 2015/0142141 | A1* | 5/2015 | Okabayashi | G08O 17/02 700/83 |
| 2015/0204556 | A1 | 7/2015 | Kusukame et al. | |
| 2015/0227118 | A1* | 8/2015 | Wong | G05B 15/02 700/44 |
| 2015/0346701 | A1* | 12/2015 | Gordon | G05B 15/02 700/275 |

FOREIGN PATENT DOCUMENTS

| | | |
|---|---|---|
| JP | 2005-223799 A | 8/2005 |
| JP | 2005-295160 A | 10/2005 |
| JP | 2007-051799 A | 3/2007 |
| JP | 2007-202051 A | 8/2007 |
| JP | 2008-121963 A | 5/2008 |
| JP | 2008-281279 A | 11/2008 |
| JP | 2009-258976 A | 11/2009 |
| JP | 2011-075138 A | 4/2011 |
| JP | 2012-109680 A | 6/2012 |
| JP | 2013-015300 A | 1/2013 |
| WO | 2014/185033 A1 | 11/2014 |

OTHER PUBLICATIONS

Extended European Search Report dated Mar. 28, 2017 issued in corresponding EP patent application No. 15868669.1.

* cited by examiner

TERMINAL DEVICE, AIR CONDITIONER, AND WEARABLE TERMINAL

CROSS REFERENCE TO RELATED APPLICATION

This application is a U.S. national stage application of International Patent Application No. PCT/JP2015/059588 filed on Mar. 27, 2015, the disclosure of which is incorporated herein by reference.

TECHNICAL FIELD

The present invention relates to a terminal device that remotely controls an air conditioner, an air conditioner, and a wearable terminal.

BACKGROUND

Conventionally, there is an air conditioning system in which a mobile terminal held by a user outside his house remotely controls an air conditioner in the house. For example, Patent Literature 1 described below discloses a technique in which a mobile terminal estimates the time at which a user comes home based on the position and the moving speed of the mobile terminal and position information of his house, to control the air conditioner according to a registered control pattern, so as to be able to provide a comfortable environment for the user at the arrival time.

PATENT LITERATURE

Patent Literature 1: Japanese Patent Application Laid-open No. 2005-223799

However, according to the conventional technique described above, the temperature or humidity outside the house changes according to the influence of the weather on that day, and the comfortable environment for the user may be different for each day. Therefore, there is a problem in that the control content in which a mobile terminal controls the air conditioner may not be comfortable for the user.

SUMMARY

The present invention has been achieved in view of the above problem, and an object of the present invention is to provide a terminal device that can provide a comfortable environment for a user after the user's coming home matched with an environment of the user before the user's coming home.

There is provided a terminal device according to an aspect of the present invention including: a position detection unit that detects a current position of the terminal device; an environmental-information acquisition unit that acquires environmental information of the terminal device; a storage unit that stores therein a behavior pattern of a user of the terminal device, a control pattern of an air conditioner associated with the behavior pattern, and air-conditioner position information; a control unit that estimates an arrival time at which the user arrives at a position of the air conditioner based on the current position, a moving speed included in the environmental information, and the air-conditioner position information, estimates a behavior pattern of the user by using the moving speed, and decides a control pattern of the air conditioner based on the environmental information and the estimated behavior pattern, to generate a control signal including control information to the air conditioner based on the arrival time and the estimated control pattern; and a wireless communication unit that transmits the control signal generated by the control unit to the air conditioner.

The terminal device according to the present invention can provide a comfortable environment for a user after the user's coming home matched with an environment before the user's coming home.

DETAILED DESCRIPTION

Exemplary embodiments of a terminal device, an air conditioner, and a wearable terminal according to the present invention will be explained below in detail with reference to the accompanying drawings. The present invention is not limited to the embodiments.

First Embodiment

Figure 1:
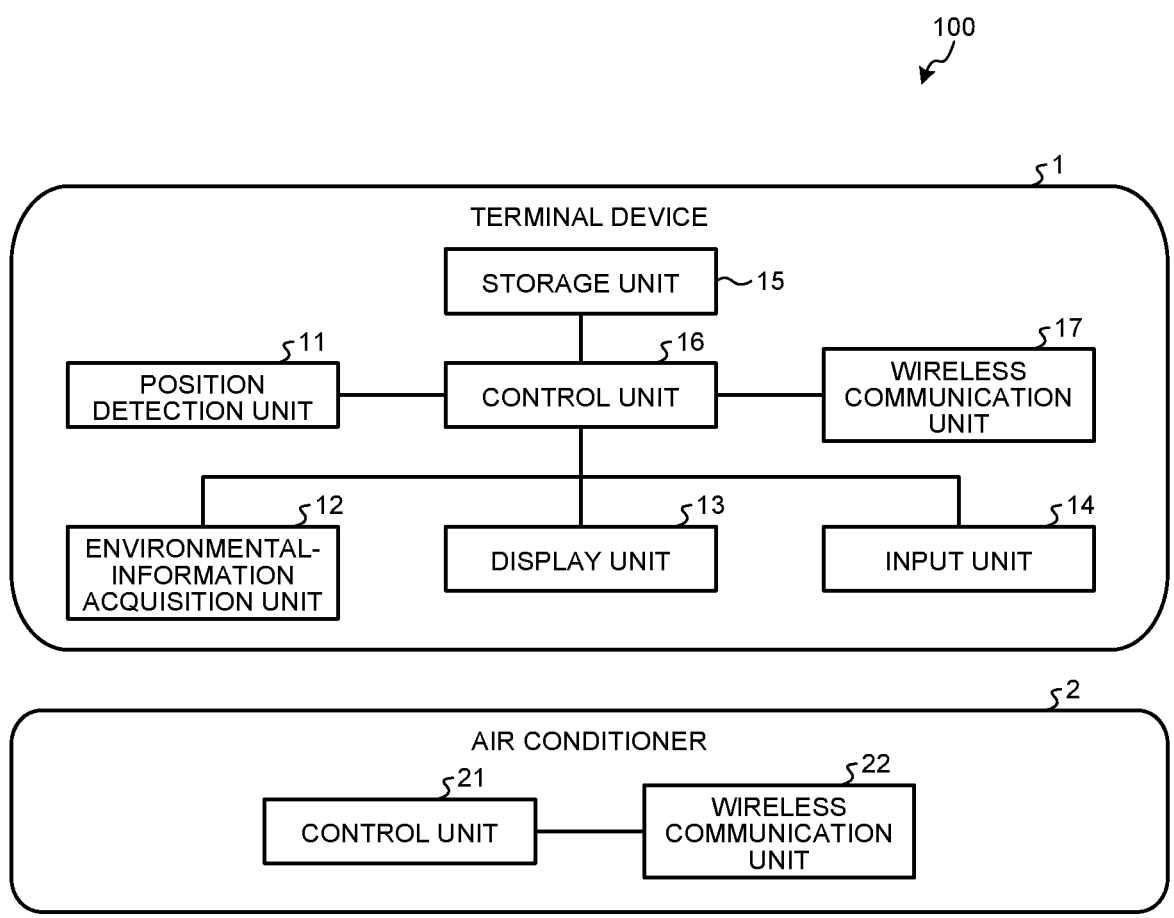
FIG. 1 is a block diagram illustrating a configuration example of an air conditioning system according to a first embodiment.

FIG. 1 is a block diagram illustrating a configuration example of an air conditioning system 100 according to a first embodiment of the present invention. The air conditioning system 100 includes a mobile terminal device 1 that can remotely control an air conditioner 2, and the air conditioner 2 that executes air conditioning control under control of the terminal device 1. A user can bring out the terminal device 1 from his house where the air conditioner 2 is installed, and can control the air conditioner 2 from outside the house via the terminal device 1. Communication between the terminal device 1 and the air conditioner 2 is performed wirelessly. However, the communication is not limited to direct connection, and the terminal device 1 and the air conditioner 2 can be indirectly connected to each other via another device. For example, when the air conditioner 2 is connected to a mobile phone network or the Internet network via a router in the house, the terminal device 1 outside the house controls the air conditioner 2 via the router in the house from the mobile phone network or the Internet network. The air conditioner 2 and the router can be connected to each other via a wireless LAN (Local Area Network), and the connection method is not limited.

The terminal device 1 includes a position detection unit 11 that detects the current position of the terminal device 1; an environmental-information acquisition unit 12 that acquires environmental information of the device; a display unit 13 that displays environmental information acquired by the environmental-information acquisition unit 12; and an input unit 14 that receives an input of a behavior pattern of the user and a control pattern of the air conditioner 2 associated with the behavior pattern. The terminal device 1 also includes a storage unit 15 that stores therein one or a plurality of behavior patterns of the user of the device, one or a plurality of control patterns of the air conditioner 2 associated with each behavior pattern, and the position information of the air conditioner 2; a control unit 16 that comprehensively controls the operation of the device; and a wireless communication unit 17 that performs wireless communication with the air conditioner 2.

The position detection unit 11 is, for example, a position detection sensor that detects the current position of the device by receiving radio waves from a plurality of GPS (Global Positioning System) satellites. A method of detecting the current position of the device is not limited thereto.

The environmental-information acquisition unit 12 includes one or a plurality of sensors, to acquire the moving speed of the device, and the environmental information such as the ambient temperature and humidity.

The sensors provided in the environmental-information acquisition unit 12 are, for example, an acceleration sensor that measures the moving speed of the device, a gyro sensor that measures a state of motion of the user carrying the device, an illuminance sensor that measures ambient brightness of the device, a temperature sensor that measures the ambient temperature of the device, a humidity sensor that measures the ambient humidity of the device, a proximity sensor that measures the ambient condition of the device, and an atmospheric pressure sensor that measures atmospheric pressure around the device. The environmental-information acquisition unit 12 does not need to include all these sensors, and may not include a part of these sensors.

The control unit 16 described later uses the measurement results of these sensors as the environmental information, and estimates an amount of motion of the user by using the information, for example, the moving speed measured by the acceleration sensor and the user's state of motion measured by the gyro sensor. The control unit 16 also estimates the environment in which the device is located by using information such as the ambient brightness of the device measured by the illuminance sensor, and the ambient condition of the device measured by the proximity sensor.

The display unit 13 is a display such as an LCD (Liquid Crystal Display) provided in the terminal device 1. The display unit 13 displays the environmental information acquired by the environmental-information acquisition unit 12, the information of the behavior pattern and the control pattern input by the input unit 14, and the information of the control pattern decided by the control unit 16, under control of the control unit 16.

The input unit 14 is an input interface that receives registration of the behavior pattern and the control pattern from the user or the like. The input unit 14 is a keyboard, an operation button, or a device that reads the information from a recording medium. However, the input unit 14 is not limited thereto. The input unit 14 can be a touch panel integrated with the display unit 13.

The behavior patterns of the user are pieces of user information including information on means for moving of the user such as movement on foot, movement by car, or running around the house. When the user carries the terminal device 1, the control unit 16 estimates the current behavior pattern of the user from the information of the behavior patterns of the user registered in the storage unit 15 based on the moving speed acquired by the acceleration sensor and the state of motion of the user acquired by the gyro sensor of the environmental-information acquisition unit 12, or based on the moving speed. The behavior patterns are not limited to the three patterns described above, and can be two behavior patterns or four or more behavior patterns.

The control pattern is the control content of the air conditioner 2 associated with the behavior patterns. For example, in the case of the behavior pattern where the user is moving by car, the control pattern associated with this behavior pattern is to set the temperature and humidity of the air conditioner 2 to the same temperature and humidity as those of the in-vehicle environment acquired by the environmental-information acquisition unit 12 of the terminal device 1. In the case of the behavior pattern where the user is moving on foot, the control pattern associated with this behavior pattern is to set the temperature of the air conditioner 2 to 15° C., if the ambient temperature acquired by the environmental-information acquisition unit 12 of the terminal device 1 is lower than 15° C. If the ambient temperature is equal to or higher than 15° C. and lower than 25° C., the control pattern is to set the temperature of the air conditioner 2 to the same as the ambient temperature. If the ambient temperature is equal to or higher than 25° C., the control pattern is to set the temperature of the air conditioner 2 to 25° C. In the case of the behavior pattern where the user is running, the control pattern is to set the temperature of the air conditioner 2 to be lower than the temperature setting in the case of moving on foot by 3° C., and to set the air volume more than that of the case of moving on foot. It is desired that the temperature of the respective control patterns is set to a state where there is no rapid change in an environment where the user stays before and after the user's coming home, that is, a state where a heat shock hardly occurs. These control patterns are an example only, and can be set by the user according to the user's preference, at the time of registering the behavior patterns and the control patterns initially.

The storage unit 15 stores therein pieces of information of the behavior patterns and the control patterns input from the input unit 14 and the position information of the air conditioner 2. When it is assumed that the user is moving on foot, the user is moving by car, or the user is running as described above, the storage unit 15 stores therein information for the control unit 16 to determine that the user is moving on foot, for example, if the moving speed of the user is lower than 10 km/h, that the user is running if the moving speed of the user is equal to or higher than 10 km/h but lower than 20 km/h, or that the user is moving by car if the moving speed of the user is higher than 20 km/h, as the behavior patterns. The information in the case of determining the behavior pattern based on only the moving speed has been described. However, this is just an example, and the storage unit 15 can store therein information including the information of the user's state of motion acquired by the gyro sensor of the environmental-information acquisition unit 12 in addition to the moving speed for the control unit 16 to determine the behavior pattern of the user.

In association with the behavior pattern where the user is moving on foot, the storage unit 15 stores therein the control pattern such that when the outside air temperature acquired by the environmental-information acquisition unit 12 is lower than 15° C., the temperature of the air conditioner 2 is set to 15° C., when the outside air temperature is from 15° C. to lower than 25° C., the temperature of the air conditioner 2 is set to the same as the outside air temperature, and when the outside air temperature is equal to or higher than 25° C., the temperature of the air conditioner 2 is set to 25° C. Further, in association with the behavior pattern where the user is running, the storage unit 15 stores therein the control pattern such that when the outside air temperature acquired by the environmental-information acquisition unit 12 is lower than 15° C., the temperature of the air conditioner 2 is set to 12° C., when the outside air temperature is from 15° C. to lower than 25° C., the temperature of the air conditioner 2 is set to the temperature lower than the outside air temperature by 3° C., and when the outside air temperature is equal to or higher than 25° C., the temperature of the air conditioner 2 is set to 22° C., and the air volume is set to be strong in the setting of the respective temperatures. In association with the behavior pattern where the user is moving by car, the storage unit 15 stores therein the control pattern such that the temperature of the air conditioner 2 is set to the same as the temperature acquired by the environmental-information acquisition unit 12. The control pattern in which the temperature and the air volume are set with respect to the air conditioner 2 has been described. However, it is just an example, and the storage unit 15 can store therein the information of the control pattern in which the humidity is set with respect to the air conditioner 2 by using the information of the humidity acquired by the environmental-information acquisition unit 12.

Regarding the position information of the air conditioner 2, which is air-conditioner position information, the storage unit 15 can register a current position of the terminal device 1 detected by the position detection unit 11 around the position where the air conditioner 2 is installed, as the position information of the air conditioner 2. However, the position information is not limited thereto. The present invention is described below while assuming that the position of the air conditioner 2 is at the house, and the position information of the air conditioner 2 is the position information of the house.

The control unit 16 is a processor that estimates the behavior pattern of the user based on the current position detected by the position detection unit 11, the environmental information acquired by the environmental-information acquisition unit 12, and the position information of the house stored in the storage unit 15, to decide the control pattern of the air conditioner 2. In more detail, the control unit 16 estimates the distance from the current position to the house by using the current position detected by the position detection unit 11 and the position information of the house stored in the storage unit 15. Thereafter, the control unit 16 estimates an arrival time when the user comes home by using the estimated distance from the current position to the house and the moving speed included in the environmental information acquired by the environmental-information acquisition unit 12. The control unit 16 also estimates the behavior pattern of the user based on the moving speed and the user's state of motion or based on the moving speed, and decides the control pattern of the air conditioner 2 based on the environmental information and the behavior pattern of the user. The control unit 16 decides the control content of air conditioning control with respect to the air conditioner 2 based on the arrival time and the decided control pattern, and generates a control signal including control information based on the decided control content. The control content of the air conditioning control with respect to the air conditioner 2 at this time is to set such that the environment of a room where the air conditioner 2 is installed is in a state of the temperature set by the control pattern at a time point when the user comes home.

The wireless communication unit 17 is a communication device that transmits the control signal generated by the control unit 16 to the air conditioner 2.

The configuration of the air conditioner 2 is described next. The air conditioner 2 includes a control unit 21 that comprehensively controls the operation of the air conditioner 2, and a wireless communication unit 22 that performs wireless communication with the terminal device 1.

The control unit 21 is a processor that executes air conditioning control of the air conditioner 2 based on the control signal for controlling the air conditioner 2, transmitted from the terminal device 1 and received by the wireless communication unit 22.

The wireless communication unit 22 is a communication device that receives the control signal for controlling the air conditioner 2, transmitted from the terminal device 1.

Figure 2:
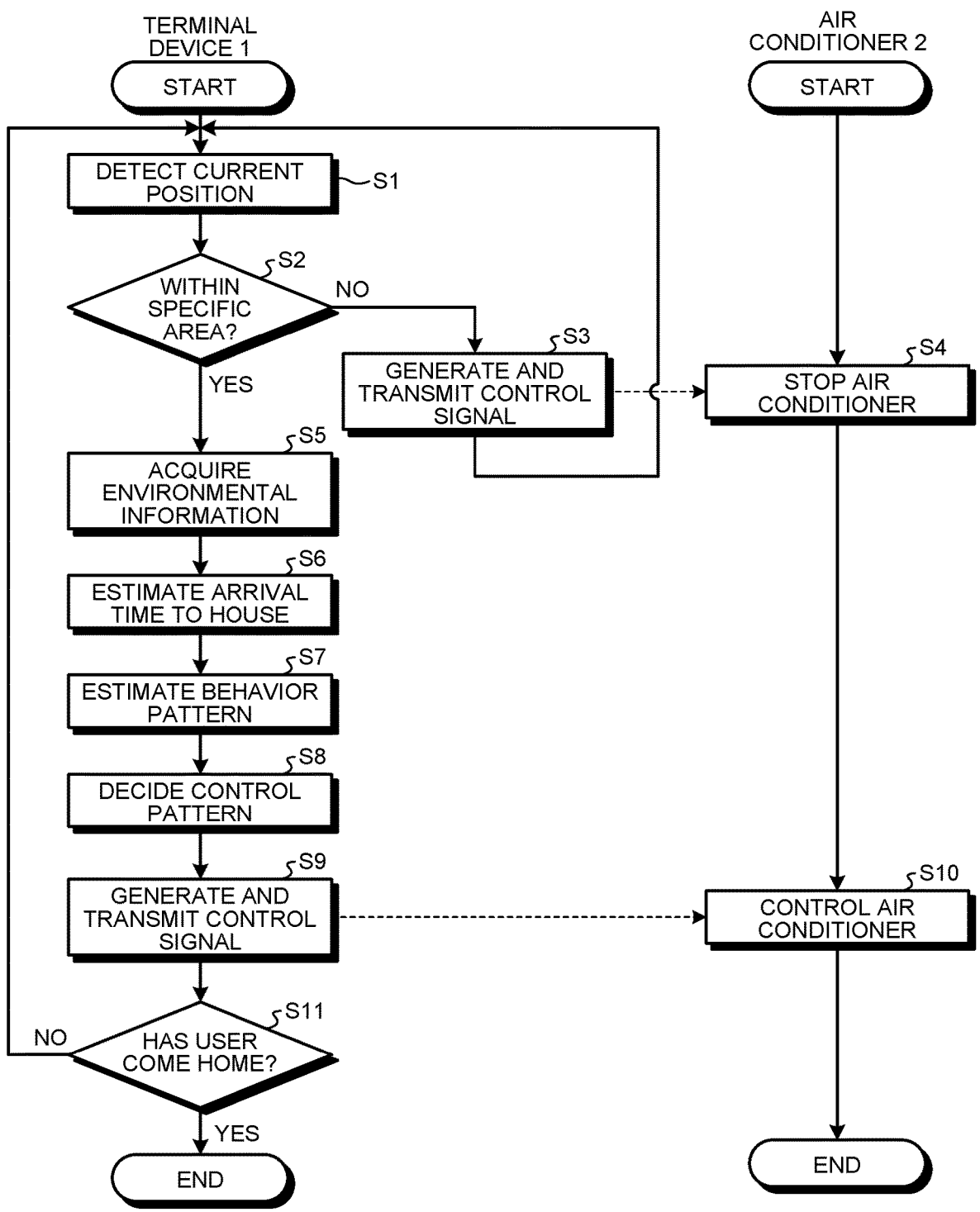
FIG. 2 is a flowchart illustrating a process of air conditioning control in the air conditioning system according to the first embodiment.

The operation of the terminal device 1 to remotely control the air conditioner 2 in the air conditioning system 100 is described next. FIG. 2 is a flowchart illustrating a process of the air conditioning control in the air conditioning system 100 according to the first embodiment.

First, in the terminal device 1, the position detection unit 11 detects the current position of the terminal device 1 (Step S1). The control unit 16 determines whether the current position of the terminal device 1 is within a specific area near the house, which is set as an extent where the air conditioner 2 is remotely controlled (Step S2). When having determined that the current position of the terminal device 1 is outside the specific area (NO at Step S2), the control unit 16 generates a control signal to stop the air conditioner 2 and transmits the generated control signal from the wireless communication unit 17 to the air conditioner 2 (Step S3), and the process returns to Step S1. In the air conditioner 2, the control unit 21 stops the air conditioner 2 based on the control content transmitted from the terminal device 1 and is acquired via the wireless communication unit 22 (Step S4).

Regarding the specific area, there is a method of setting an area from the input unit 14 of the terminal device 1 and registering the area in the storage unit 15 by the user. However, the method is just an example, and a setting method of the specific area is not limited thereto.

Returning to Step S1, the position detection unit 11 detects the current position of the terminal device 1 (Step S1). The control unit 16 determines whether the current position of the terminal device 1 is within the specific area (Step S2). When having determined that the current position of the terminal device 1 is outside the specific area (NO at Step S2), and when having already executed the control to stop the air conditioner 2, the control unit 16 may omit a process at Step S3. For example, if the user is moving away from the house while carrying the terminal device 1, it is a useless operation for the terminal device 1 and the air conditioner 2 to perform the processes at Steps S3 and S4 at all times. Therefore, the omission of the process at Step S3 is to avoid the useless operation.

When the control unit 16 has determined that the current position of the terminal device 1 is within the specific area (YES at Step S2), the environmental-information acquisition unit 12 acquires the environmental information of the terminal device 1 by using the sensor (Step S5). The information that can be acquired by the environmental-information acquisition unit 12 is the information that can be measured by the respective sensors.

When the acquired environmental information includes information that can be obviously considered to be abnormal, for example, when the temperature is equal to or higher than 50° C., the environmental-information acquisition unit 12 estimates that the environment where the user is in is different from the environment where the terminal device 1 is located. In the example described above, the environmental-information acquisition unit 12 can estimate that only the terminal device 1 is in a bag or is left unattended in a car where air conditioning is turned off.

The environmental-information acquisition unit 12 determines not to use the information that can be obviously considered to be abnormal for the air conditioning control. When there is the information that is obviously considered to be abnormal, or the terminal device 1 does not have the sensor function, the environmental-information acquisition unit 12 can instruct the control unit 16 to acquire environmental data around the user by using weather information acquisition service or the like on a website based on the information of the current position of the user and use the environmental data for the air conditioning control. For example, the information of 50° C. described above, which is a threshold for determining that the temperature is abnormal, is set via the input unit 14 and stored in the storage unit 15 in advance.

The control unit 16 uses the current position detected by the position detection unit 11, the moving speed included in the environmental information acquired by the environmental-information acquisition unit 12, and the position information of the air conditioner 2 stored in the storage unit 15, to estimate first the distance to the house based on the current position and the position information of the house, and estimates the arrival time at which the user comes home based on the moving speed and the estimated distance to the house (Step S6). If the control unit 16 has the information of the current position acquired previously and the arrival time has been estimated, the control unit 16 can estimate the arrival time to the house based on a difference between the position used for estimating the arrival time and the current position, or a difference between the time at the time of estimating the arrival time and the current time.

The control unit 16 estimates the corresponding behavior pattern based on the behavior patterns of the user stored in the storage unit 15 by using pieces of information such as the moving speed, the user's state of motion, and the like (Step S7) included in the environmental information acquired by the environmental-information acquisition unit 12. The control unit 16 estimates the means for moving of the user, for example, moving on foot, moving by car, or running, based on the moving speed and the user's state of motion. The control unit 16 can estimate the behavior pattern of the user by using only the moving speed. The control unit 16 can use information such as time, date, and day of the week in estimation of the behavior pattern. The control unit 16 can improve estimation accuracy by estimating the behavior pattern including information of a difference in the behavior of the user for each day of the week or at a certain time. For example, the user only runs on Saturdays or Sundays, or only in early morning.

The control unit 16 decides the corresponding control pattern from the control patterns of the air conditioner 2, which are associated with the behavior patterns and registered in the storage unit 15, based on the environmental information acquired by the environmental-information acquisition unit 12 and the estimated behavior pattern (Step S8). When the information on the control pattern described above has been registered in the storage unit 15, for example, if the ambient temperature is 5° C. when the user is coming home on foot, the control unit 16 decides the control pattern in which the temperature of the air conditioner 2 is set to 15° C. that is higher than the ambient temperature. If the in-vehicle temperature is 25° C. when the user is coming home by car, the control unit 16 decides the control pattern in which the temperature of the air conditioner 2 is set to 25° C., that is the same as the in-vehicle temperature. If the ambient temperature is 30° C. when the user is running around the house on the weekend, the control unit 16 decides the control pattern in which the temperature of the air conditioner 2 is set to 22° C. that is lower than the ambient temperature and the air volume is set to be strong. In this manner, the control unit 16 decides the control pattern so as to set a comfortable temperature matched with the condition of the user before the user's coming home.

The control unit 16 generates a control signal including the control information with respect to the air conditioner 2 based on the decided control pattern and the estimated arrival time, and transmits the generated control signal from the wireless communication unit 17 to the air conditioner 2 (Step S9). The air conditioner 2 is controlled based on the control signal from the terminal device 1 acquired via the wireless communication unit 22 (Step S10).

In the terminal device 1, the control unit 16 executes control to repeat the process of the air conditioning control described above by returning to Step S1, until the control unit 16 determines that the terminal device 1 has reached home based on the current position detected by the position detection unit 11 (NO at Step S11). The terminal device 1 can handle a change of condition of the user while the user is on the way home, and even if the arrival time to the house is changed from the previous estimation, or if the environment such as the temperature of the place where the user is in is changed, the terminal device 1 can appropriately change the air conditioning control content automatically corresponding thereto. Accordingly, the user can acquire a comfortable environment at the time of coming home without controlling the air conditioner 2. When determining that the user has come home (YES at Step S11), the control unit 16 finishes the process of the air conditioning control.

As described above, according to the present embodiment, in the air conditioning system 100, the terminal device 1 decides the control content of the air conditioner 2 based on the ambient environment of the user, and provides a comfortable environment for the user after the user's coming home matched with an environment before the user's coming home. Accordingly, the user can acquire the comfortable air-conditioned environment when coming home without operating the terminal device 1 on the way home. Because the ambient environment where the user stays before coming home and the environment in the house where the user stays after coming home are not largely different, it can be avoided that the user suffers from a health problem due to a heat shock. In the air conditioning system 100, even if the user's arrival time to the house is changed from and later than the previous estimation, because the terminal device 1 controls the air conditioner 2 by following thereto, such control to warm the room in the house gradually can be executed, thereby enabling to acquire an energy saving effect in the operation of the air conditioner 2.

Second Embodiment

In the first embodiment, the air conditioner 2 is controlled by using the environmental information acquired by the various sensors provided in the mobile terminal device 1 such as a smart phone, and the pieces of information of the behavior patterns of a user and the control patterns of the air conditioner 2 registered beforehand. In the present embodiment, there is described a method of controlling the air conditioner 2 by using the environmental information acquired by various sensors provided in a wearable terminal such as a watch-type or a glasses-type terminal that the user wears.

Figure 3:
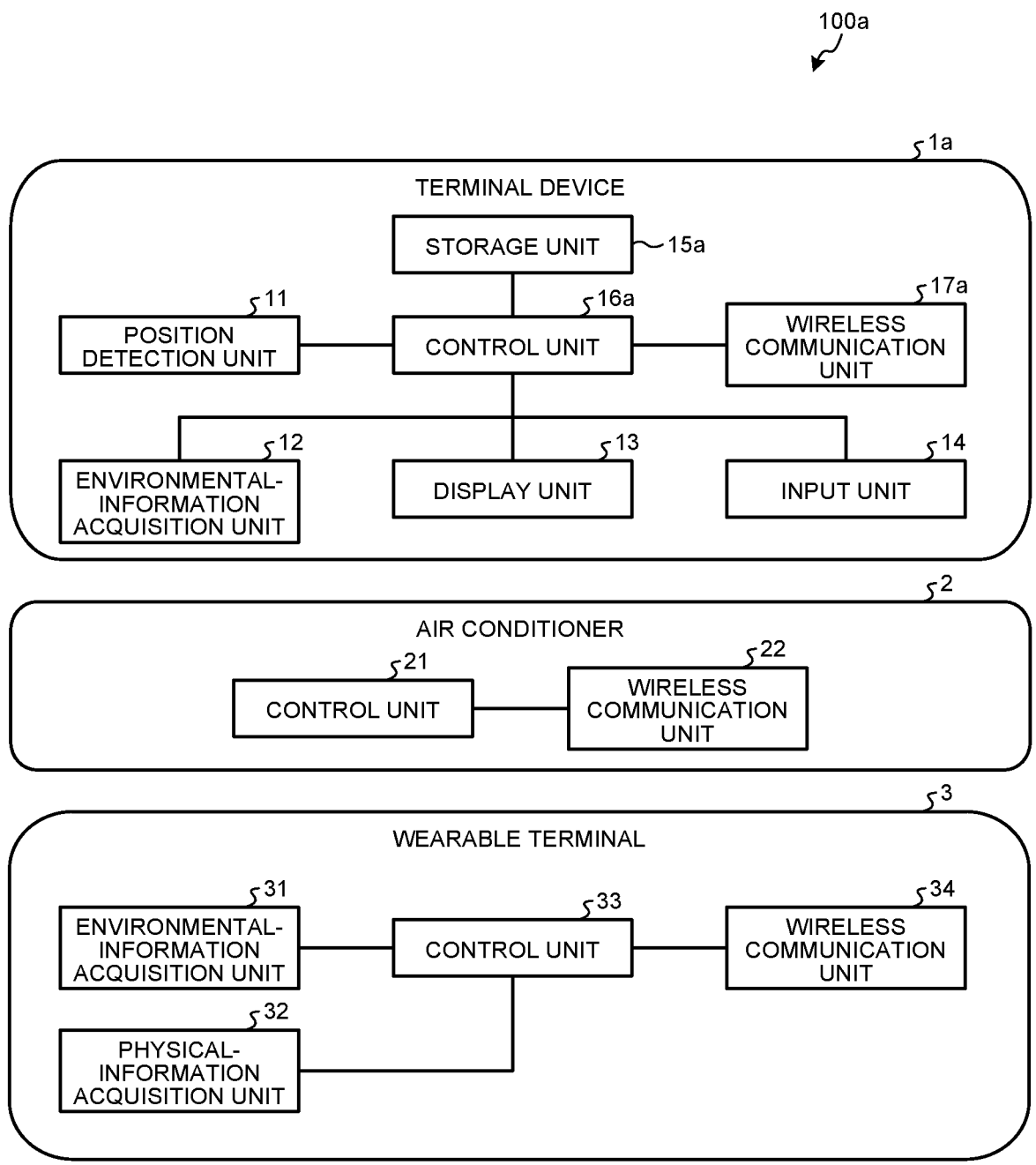
FIG. 3 is a block diagram illustrating a configuration example of an air conditioning system according to a second embodiment.

FIG. 3 is a block diagram illustrating a configuration example of an air conditioning system 100a according to a second embodiment. The air conditioning system 100a includes a mobile terminal device 1a that can remotely control the air conditioner 2, the air conditioner 2 that executes air conditioning control under control of the terminal device 1a, and a wearable terminal 3 that acquires physical information of a user. Communication between the terminal device 1a and the wearable terminal 3 is performed by wireless communication. A communication method between the terminal device 1a and the wearable terminal 3 includes the Bluetooth (registered trademark), an infrared method, and the like. However, the method is not limited thereto.

In the terminal device 1a, the storage unit 15, the control unit 16, and the wireless communication unit 17 in the terminal device 1 according to the first embodiment are replaced by a storage unit 15a, a control unit 16a, and a wireless communication unit 17a, respectively. Other configurations of the terminal device 1a are the same as those of the terminal device 1.

The storage unit 15a is a memory that stores therein pieces of information of the behavior patterns and the control patterns input from the input unit 14, and the position information of the air conditioner 2. However, as for the contents of the behavior patterns and the control patterns stored in the storage unit 15a, the physical information acquired by the wearable terminal 3 is used.

In addition to the operation of the control unit 16 according to the first embodiment, the control unit 16a estimates the behavior pattern of the user to decide the control pattern of the air conditioner 2, by using ambient environmental information of the wearable terminal 3 and physical information of the user who wears the wearable terminal 3 acquired from the wearable terminal 3 worn by the user via the wireless communication unit 17a.

The wireless communication unit 17a performs wireless communication with the air conditioner 2 and the wearable terminal 3. In the wireless communication unit 17a, a method of performing the wireless communication with the air conditioner 2 is the same as that of the wireless communication unit 17 according to the first embodiment.

The wearable terminal 3 includes an environmental-information acquisition unit 31 that acquires environmental information of the wearable terminal 3, a physical-information acquisition unit 32 that acquires physical information which is data of the physical condition of the user who wears the wearable terminal 3, a control unit 33 that comprehensively controls the operation of the wearable terminal 3, and a wireless communication unit 34 that performs wireless communication with the terminal device 1a.

The environmental-information acquisition unit 31 includes one or a plurality of sensors to acquire the environmental information around the wearable terminal 3. The sensors provided in the environmental-information acquisition unit 31 are, for example, a temperature sensor that measures the ambient temperature of the wearable terminal 3, and a humidity sensor that measures the ambient humidity of the terminal. The environmental-information acquisition unit 31 can include the same sensors as those of the environmental-information acquisition unit 12 of the terminal device 1a.

The physical-information acquisition unit 32 includes one or a plurality of sensors to acquire pieces of physical information of the user. The sensors provided in the physical-information acquisition unit 32 are, for example, a body temperature sensor that measures user's body temperature, a pulse sensor that measures user's pulse, and a water volume sensor that measures an amount of perspiration of the user. When estimating the behavior pattern of the user, the control unit 16a of the terminal device 1a can estimate an amount of motion of the user by using the information of the user's pulse, the amount of perspiration of the user, and the like.

The control unit 33 is a processor that executes control of transmitting the environmental information acquired by the environmental-information acquisition unit 31 and the physical information acquired by the physical-information acquisition unit 32 to the terminal device 1a.

The wireless communication unit 34 is a communication device that transmits the environmental information acquired by the environmental-information acquisition unit 31 and the physical information acquired by the physical-information acquisition unit 32 to the terminal device 1a.

Figure 4:
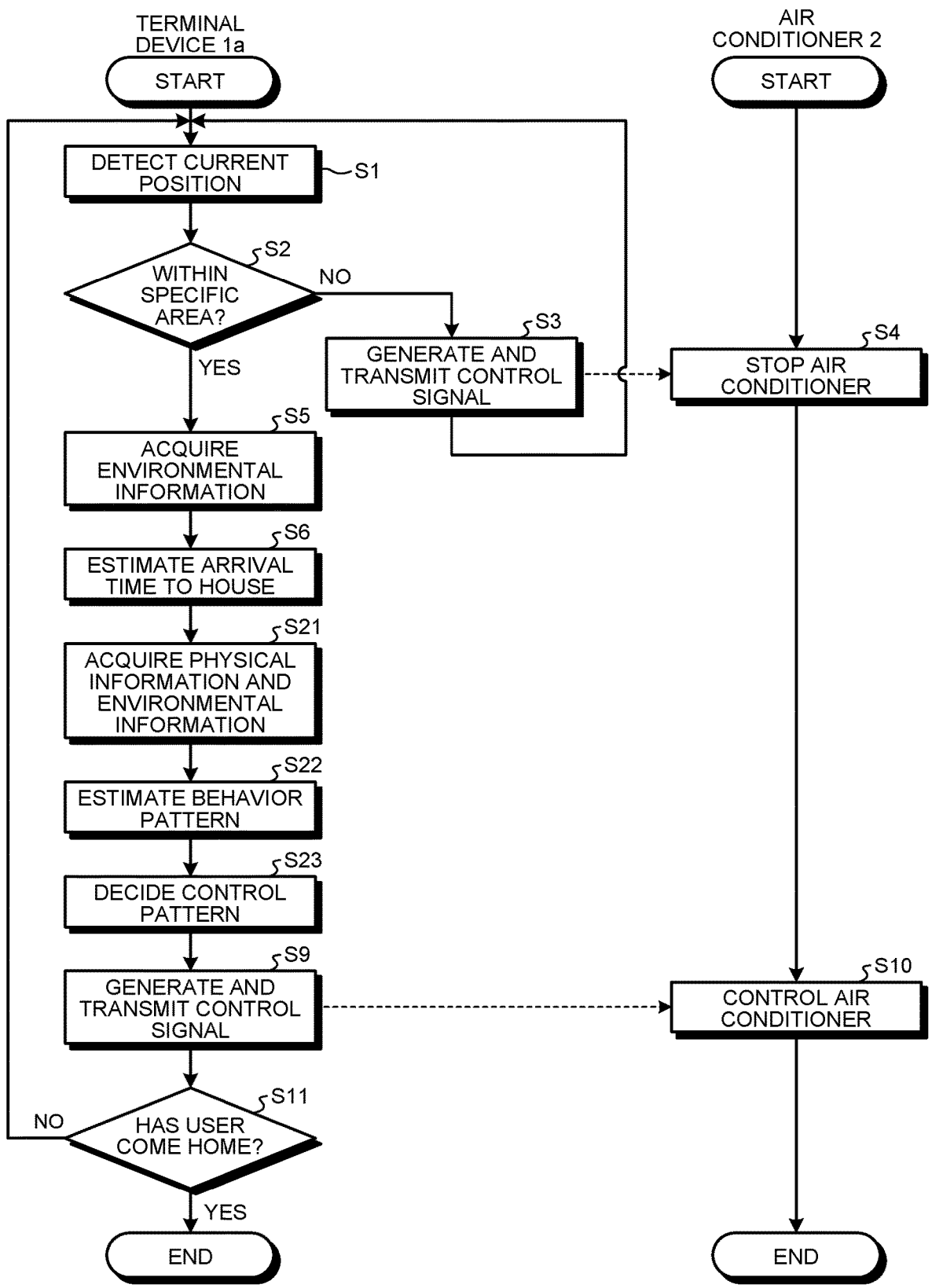
FIG. 4 is a flowchart illustrating a process of air conditioning control in the air conditioning system according to the second embodiment.

Subsequently, an operation of the terminal device 1a to remotely control the air conditioner 2 in the air conditioning system 100a is described. FIG. 4 is a flowchart illustrating a process of air conditioning control in the air conditioning system 100a according to the second embodiment. Because process contents from Steps S1 to S6 and from Steps S9 to S11 are the same as those in the first embodiment, explanations thereof are omitted.

After the control unit 16a estimates the arrival time at which the user comes home (Step S6), the terminal device 1a acquires the physical information and the environmental information from the wearable terminal 3 via the wireless communication unit 17a (Step S21).

The control unit 16a estimates a corresponding behavior pattern out of the behavior patterns of the user stored in the storage unit 15a, by using the moving speed and the user's state of motion included in the environmental information acquired by the environmental-information acquisition unit 12, and the physical information and the environmental information acquired by the wearable terminal 3 (Step S22). The control unit 16a can estimate the behavior pattern with higher accuracy as compared with the first embodiment, by using the pieces of information such as the user's body temperature, pulse, and the amount of perspiration included in the physical information acquired by the wearable terminal 3. For example, even if it cannot be determined whether the user is moving on foot or running based on the moving speed, the control unit 16a can improve estimation accuracy of the behavior pattern by using the pieces of information of the pulse and the amount of perspiration. Therefore, as in the case of the moving speed described in the first embodiment, the storage unit 15a stores therein, as the behavior patterns, pieces of information for the control unit 16a to determine, for example, that the user is moving on foot when the user's pulse is lower than a certain value, and that the user is running when the user's pulse is equal to or higher than the certain value.

The control unit 16a decides the corresponding control pattern from the control patterns of the air conditioner 2 associated with the behavior pattern and registered in the storage unit 15a, based on the environmental information acquired by the environmental-information acquisition unit 12, the estimated behavior pattern, and the physical information and the environmental information acquired by the wearable terminal 3 (Step S23). The control unit 16a can decide the control pattern with higher accuracy as compared with the first embodiment, by using the pieces of information such as the body temperature, the pulse, and the amount of perspiration of the user included in the physical information acquired by the wearable terminal 3. For example, when the user is running, it is assumed that the amount of perspiration is different from day to day. In this case, the control unit 16a can decide the control pattern of the air conditioner 2, so that the user fells more comfortable when compared with the first embodiment, by changing the air volume of the air conditioner 2 depending on the amount of perspiration. Therefore, as in the case of the temperature described in the first embodiment, for example, the storage unit 15a stores therein the control patterns such that the air volume is set to be weak when the user's amount of perspiration is lower than a certain value, and the air volume is set to be strong when the user's amount of perspiration is equal to or higher than the certain value.

When the terminal device 1 is left unattended in the vehicle and the abnormal temperature is detected by the environmental-information acquisition unit 12 as in the second embodiment, the control unit 16a can decide the control pattern of the air conditioner 2 so that the user feels more comfortable when compared with the first embodiment, by using the temperature information acquired by the environmental-information acquisition unit 31 of the wearable terminal 3.

In the first embodiment, because the environmental-information acquisition unit 12 of the terminal device 1 measures the temperature and the like, the terminal device 1 is susceptive to an influence of the environment where the terminal device 1 is placed. Such a case is assumed that the air conditioning control is executed based on the information different from the temperature or humidity being felt by the user, by using the environmental information in a pocket, in a bag, or in a vehicle for the air conditioning control. According to the second embodiment, the wearable terminal 3 worn by the user can acquire the pieces of ambient environmental information such as the temperature and humidity, and also the user's physical information, which cannot be acquired in the first embodiment. Therefore, the terminal device 1a can control the air conditioner 2 based on the information with higher accuracy by using the information acquired by the wearable terminal 3, and the air conditioning control where the user feels more comfortable can be executed.

As described above, according to the present embodiment, in the air conditioning system 100a, the terminal device 1a estimates the behavior pattern of the user to decide the control pattern of the air conditioner 2 by further using the environmental information and the physical information acquired by the wearable terminal 3. Accordingly, the terminal device 1a can execute the air conditioning control so that the user feels more comfortable as compared with the first embodiment.

Figure 5:
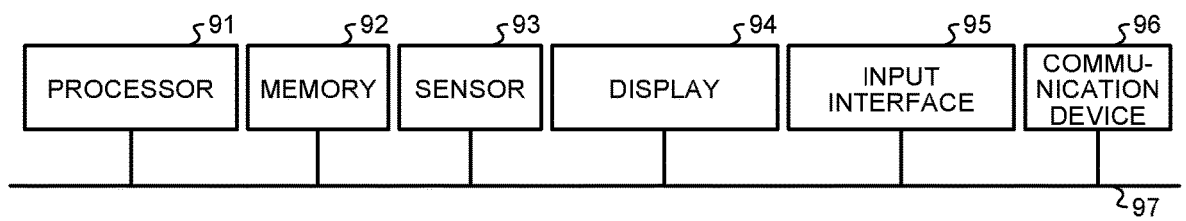
FIG. 5 is a diagram illustrating a hardware configuration example of a terminal device according to the first and second embodiments.

A hardware configuration that realizes the respective configurations illustrated in block diagrams of the terminal device 1 of the air conditioning system 100 in FIG. 1 and the terminal device 1a of the air conditioning system 100a in FIG. 3 is described. FIG. 5 is a diagram illustrating a hardware configuration example of the terminal device 1 according to the first embodiment and the terminal device 1a according to the second embodiment. The position detection unit 11 and the environmental-information acquisition unit 12 are realized by a sensor 93. The display unit 13 is realized by a display 94. The input unit 14 is realized by an input interface 95. The storage unit 15 and the storage unit 15a are realized by a memory 92. The control unit 16 and the control unit 16a are realized by a processor 91 by executing programs for respective configurations stored in the memory 92. The wireless communication unit 17 and the wireless communication unit 17a are realized by a communication device 96. The processor 91, the memory 92, the sensor 93, the display 94, the input interface 95, and the communication device 96 are connected by a system bus 97. In the terminal device 1 and the terminal device 1a, a plurality of processors 91 and a plurality of memories 92 can execute functions of the respective configurations illustrated in a block diagram of FIG. 1 or FIG. 3 in association with each other. The terminal device 1 and the terminal device 1a can be realized by the hardware configuration illustrated in FIG. 5. However, a part of the configuration can be realized by either software or hardware.

Regarding the configuration of the air conditioner 2 of the air conditioning system 100 in FIG. 1 and the air conditioning system 100a in FIG. 3, the control unit 21 is a processor and is realized when a program for the control unit 21 stored in the memory is executed. The wireless communication unit 22 is realized by a communication device.

The wearable terminal 3 of the air conditioning system 100a in FIG. 3 can be also described by using the diagram of the hardware configuration example in FIG. 5 in the same manner. The environmental-information acquisition unit 31 and the physical-information acquisition unit 32 are realized by the sensor 93. The control unit 33 is realized by the processor 91 when the processor 91 executes a program for the control unit 33 stored in the memory 92. The wireless communication unit 34 is realized by the communication device 96. When the wearable terminal 3 is a watch-type or a glasses-type terminal as described above, such a case is assumed that the wearable terminal 3 has a configuration corresponding to the display 94 and the input interface 95. However, with respect to the air conditioning control process according to the present embodiment, the display 94 and the input interface 95 may be omitted.

The configuration described in the above embodiments is an example of the contents of the present invention. The configuration can be combined with other well-known techniques, and can be configured while modifying it without departing from the scope of the invention, such as omitting a part the configuration.

The invention claimed is:
1. A terminal device comprising:
a sensor to detect a current position of the terminal device and acquire environmental information of the terminal device, the environmental information including a moving speed of the terminal device and measured ambient temperature and humidity around the terminal device;
a processor to execute a program;
a memory to:
store therein a plurality of behavior patterns of a user of the terminal device, including movement on foot, further including walking and running, and movement by car, a plurality of control patterns of an air conditioner associated respectively with the behavior patterns, and air-conditioner position information, and further
store the program which, when executed by the processor, performs processes of:
estimating an arrival time at which the user of the terminal device arrives at a position of the air conditioner based on: the current position of the terminal device, the moving speed included in the environmental information, and the air-conditioner position information,
estimating a current behavior pattern of the user of the terminal device by using the moving speed of the terminal device, and deciding a control pattern of the air conditioner based on the environmental information and the estimated behavior pattern, and generating a control signal including control information to the air conditioner based on the arrival time and the decided control pattern; and a wireless communication device to transmit the generated control signal to the air conditioner, wherein the processor changes control content to the air conditioner according to whether the current position is within a specific area.

2. The terminal device according to claim 1, comprising an input interface to receive an input of a behavior pattern and a control pattern to be stored in the memory.

3. The terminal device according to claim 1, wherein the processor estimates a behavior pattern of the user and decides a control pattern of the air conditioner, by further using environmental information around a wearable terminal worn by the user and physical information of the user acquired from the wearable terminal via the wireless communication device.

4. An air conditioner comprising:

a wireless communication device to receive a control signal transmitted from the terminal device according to claim 1;

a processor to execute a program;

a memory to store the program which, when executed by the processor, performs a process of executing air conditioning control of the air conditioner based on a control signal received by the wireless communication device.

5. A wearable terminal comprising:

a sensor to acquire environmental information around the wearable terminal and physical information of a user who wears the wearable terminal;

a processor to execute a program;

a memory to store the program which, when executed by the processor, performs a process of executing control of transmitting the environmental information and the physical information; and a wireless communication device to transmit the environmental information and the physical information to the terminal device according to claim 3 that controls an air conditioner.

6. The terminal device according to claim 1, wherein the terminal device further comprises a processing circuit; and if the acquired environmental information includes information determined to be outside of a predefined range of normal values, the processing circuit does not use the information determined to be outside of a predefined range of normal values for control of the air conditioner, and instructs the processor to acquire alternative environmental information on the current position from a website and use the acquired alternative environmental information for control of the air conditioner.

* * * * *